(12) United States Patent
Klaehn et al.

(10) Patent No.: US 9,761,910 B2
(45) Date of Patent: Sep. 12, 2017

(54) ELECTROLYTE SOLUTIONS INCLUDING A PHOSPHORANIMINE COMPOUND, AND ENERGY STORAGE DEVICES INCLUDING SAME

(71) Applicant: BATTELLE ENERGY ALLIANCE, LLC, Idaho Falls, ID (US)

(72) Inventors: John R. Klaehn, Idaho Falls, ID (US); Eric J. Dufek, Ammon, ID (US); Harry W. Rollins, Idaho Falls, ID (US); Mason K. Harrup, Idaho Falls, ID (US); Kevin L. Gering, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 168 days.

(21) Appl. No.: 14/720,493

(22) Filed: May 22, 2015

(65) Prior Publication Data

US 2015/0340739 A1 Nov. 26, 2015

Related U.S. Application Data

(60) Provisional application No. 62/002,659, filed on May 23, 2014.

(51) Int. Cl.
*H01M 10/0569* (2010.01)
*H01M 10/0525* (2010.01)

(52) U.S. Cl.
CPC ... *H01M 10/0569* (2013.01); *H01M 10/0525* (2013.01)

(58) Field of Classification Search
CPC ............................. H01M 10/052; H01M 4/60
See application file for complete search history.

(56) References Cited

U.S. PATENT DOCUMENTS

| | | | |
|---|---|---|---|
| 3,660,165 A | 5/1972 | Palmer | |
| 4,412,053 A | 10/1983 | Neilson et al. | |
| 4,523,009 A | 6/1985 | Neilson et al. | |
| 5,277,788 A | 1/1994 | Nitowski et al. | |
| 5,393,621 A | 2/1995 | Chaloner-Gill | |
| 5,478,474 A | 12/1995 | Katti et al. | |
| 6,605,237 B2 * | 8/2003 | Allcock | C08G 79/025 252/500 |
| 7,429,433 B2 | 9/2008 | Otsuki et al. | |
| 8,568,930 B2 | 10/2013 | Halalay et al. | |
| 2005/0053842 A1 | 3/2005 | Ryu et al. | |
| 2005/0106458 A1 | 5/2005 | Eguchi et al. | |
| 2010/0119956 A1 | 5/2010 | Tokuda et al. | |
| 2011/0250497 A1 | 10/2011 | Gaubicher et al. | |
| 2012/0237836 A1 | 9/2012 | Kim | |
| 2013/0011728 A1 | 1/2013 | Tokuda et al. | |
| 2013/0089793 A1 | 4/2013 | Gering et al. | |
| 2013/0216918 A1 | 8/2013 | Tokuda et al. | |
| 2013/0337317 A1 | 12/2013 | Shima et al. | |
| 2014/0134479 A1 | 5/2014 | Kim et al. | |

FOREIGN PATENT DOCUMENTS

| | | |
|---|---|---|
| EP | 2660920 A2 | 11/2013 |
| WO | 2013011297 A1 | 1/2013 |

OTHER PUBLICATIONS

International Search Report for International Patent Application No. PCT/US2015/032289, mailed Aug. 18, 2015, three (3) pages.
Written Opinion for International Patent Application No. PCT/US2015/032289, mailed Aug. 18, 2015, five (5) pages.
Allen et al., New Aspects of the Preparation and Polymerization of Cl3PNP(O)Cl2, Phosphorus, Sulfur, and Silicon, vol. 144-146, 1999, pp. 213-216.
Chang, Vinylene Carbonate and Vinylene Trithiocarbonate as Electrolyte Additives for Lithium Ion Battery, Journal of Power Sources 196 (2011), pp. 9605-9611.
Dalavi et al., Nonflammable Electrolytes for Lithium-Ion Batteries Containing Dimethyl Methylphosphonate, Journal of the Electrochemical Society, 157 (10) (2010), pp. A1113-A1120.
Emsley et al., A New and Simple Method of Preparing Dichlorophosphinylphosphor-Imidic Trichloride, J. Chem. Soc. (A) (1971), pp. 2863-2864.
Emsley, et al., Factors Influencing the Preparation of the Cyclic Phosphonitrilic Chlorides, J. Chem. Soc. (A) (1971), pp. 768-772.
Ford et al., Reactions of Mono(disilylamino)phosphines with Carbon Tetrachloridel, Inorg. Chem., vol. 23, No. 14, 1984, pp. 2063-2068.
Gololobov et al., Recent Advances in the Staudinger Reaction, Tetrahedron, vol. 48, No. 8, 1992, pp. 1353-1406.
Hirai et al., Effect of Additives on Lithium Cycling Efficiency, J. Electrochem. Soc., vol. 141, No. 9, Sep. 1994, pp. 2300-2305.
Karthikeyan et al., Synthesis of Some P-Trifluoromethyl-Substituted (Silylamino)phosphines, N-Silylphosphoranimines, and Phosphazenes, Inorganic Chemistry, vol. 38, No. 9, 1999, pp. 2079-2084.
Keat, Synthesis and Properties of Some Silylphosphinoalkylamines, J. Chem. Soc. (A) 1970, pp. 1795-1799.
Klaehn et al., Synthesis and Characterization of Mixed-Substituent N-Silylphosphoranimines, Inorg. Chem., 41, 2002, pp. 5859-5865.
Lee, et al., 3-Chloroanisole for Overcharge Protection of a Li-ion Cell, Electrochimica Acta 52, 2007, pp. 7404-7408.

(Continued)

*Primary Examiner* — Carol M Koslow
(74) *Attorney, Agent, or Firm* — TraskBritt (57) ABSTRACT

An electrolyte solution comprising at least one phosphoranimine compound and a metal salt. The at least one phosphoranimine compound comprises a compound of the chemical structure

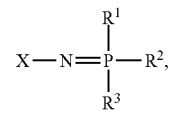

where X is an organosilyl group or a tert-butyl group and each of $R^1$, $R^2$, and $R^3$ is independently selected from the group consisting of an alkyl group, an aryl group, an alkoxy group, or an aryloxy group. An energy storage device including the electrolyte solution is also disclosed.

20 Claims, 7 Drawing Sheets

(56) References Cited

OTHER PUBLICATIONS

Li et al., Synthesis and Carbon Tetrachloride Reactions of Bis[bis(trimethylsilyl)amino]phosphines1, Inorganic Chemistry, vol. 22, No. 4, Feb. 16, 1983, pp. 575-579.
Longlet et al., Synthesis, Structure, and Reactivity of Some N-Phosphorylphosphoranimines, Inorganic Chemistry, vol. 41, No. 24, 2002, pp. 6507-6513.
Morton et al., Reactions of (Sllylamino)phosphines with Some Organic Halides1,2, Organometallics, vol. 1, No. 4, 1982, pp. 623-627.
Neilson et al., Poly(alkyl/arylphosphazenes) and Their Precursors, Chemical Reviews, vol. 88, No. 3, 1988, pp. 541-562.
Neilson et al., Some New Mixed-Substituent Phosphazenes Derived from N-Silyphosphoranimines, Journal of Inorganic and Organometallic Polymers and Materials, vol. 16, No. 14, Dec. 2006, pp. 319-326.
Neilson et al., Synthesis and Stereochemistry of Some N-Trimethylsilyl- and N-Silyl-Substituted Aminophosphines, Inorganic Chemistry, vol. 16, No. 6, 1977, pp. 1455-1459.
Neilson et al., Synthesis of (Silylamino)phosphines by the Wilburn Method, Inorg. Chem. 21, 1982, pp. 3568-3569.
Wang et al., New Cyclic and Polymeric Phosphazenes Derived from N-Silylphosphoranimines, Phosphorus, Sulfur, and Silicon, vol. 179, 2004, pp. 821-825.
Wilburn et al., Synthesis and Structural Isomerism of Some (Silylamino)phosphinimines, Inorganic Chemistry, vol. 18, No. 6, 1979, pp. 1429-1433.
Wilburn et al., Synthesis of (Silylmethyl)phosphinimines via Silyl Migration from Nitrogen to Carbon, Inorganic Chemistry, vol. 18, No. 2, 1979, pp. 347-351.
Wisian-Neilson et al., Synthesis of New N-Silylphosphinimines: Phosphazene Precursors, Inorganic Chemistry, vol. 19, No. 7, 1980, pp. 1875-1878.
Wu et al., An Electrochemically Compatible and Flame-Retardant Electrolyte Additive for Safe Lithium Ion Batteries, Journal of Power Sources 227, 2013, pp. 106-110.
Xu et al., Investigation and Application of Lithium Difluoro(oxalate)borate (LiDFOB) as Additive to Improve the Thermal Stability of Electrolyte for Lithium-Ion Batteries, Journal of Power Sources 196, 2011, pp. 6794-6801.
Hani et al., "Poly (Alkyl/Arylphosphazene) Chains and Rings Via Condensation Reactions of Si—N—P Precursors", Phosphorus, Sulfur, and Silica, vol. 41, (1989) pp. 159-164.
Neilson et al., "Ring Systems Derived from N-Silylphosphoranimines", Phosphorus, Sulfur, and Silicon, vol. 93-94, (1994) pp. 317-320.
Noth et al., "(Amino-phosphane, VIII) Über ein Octaphenyltetraphosphomitridchlorid und ein Tetraphenyldiphosphin-N-diphenylphosphino-imid", Zeitschrift für anorganische und allgemeine Chemie. vol. 349, No. 5-6, (1967) pp. 225-240.
Scherer et al., "Diamino-tert-butylphosphine. Synthesis and Conversion into N-Silylated Aminophosphine Imines with Non-Equivalent Replaceability of the Hydrogen Atoms", Angew. Chem. Int. Ed. vol. 7, 1968, pp. 541-542.
Staudinger et al., "Über neue organische Phosphorverbindungen III. Phosphinmethylenderivate und Phosphinimine", Helvetica Chimica Acta, vol. 2, Issue 1, 1919, pp. 635-646.

* cited by examiner

ELECTROLYTE SOLUTIONS INCLUDING A PHOSPHORANIMINE COMPOUND, AND ENERGY STORAGE DEVICES INCLUDING SAME

CROSS-REFERENCE TO RELATED APPLICATION

This application claims the benefit of U.S. Provisional Patent Application Ser. No. 62/002,659, filed May 23, 2014, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates generally to chemistry and to chemical compounds for use in electrolyte solutions. More specifically, the disclosure, in various embodiments, relates to electrolyte solutions including a phosphoranimine compound and to energy storage devices including the electrolyte solution.

BACKGROUND

Lithium-ion batteries play a vital role in the development of many energy-dependent applications, such as electric vehicles, portable electronics, and renewable energy storage. However, with the wide adoption of lithium-ion batteries over the last two decades, technology limitations that impede more widespread implementation of lithium-ion batteries have become evident. Foremost concerns deal with insufficient energy storage, poor safety, high cost, and inadequate lifetime of lithium-ion batteries, with ancillary issues including poor low temperature performance and problematic recyclability.

Electrolyte solutions used in lithium-ion batteries are known to be unstable at high temperatures and high voltages. Over time, the electrolyte solution turns into a tar-like material at high temperatures, which has precluded the widespread implementation of lithium-ion batteries in vehicular applications, such as in hybrid electric vehicles (HEVs) and plug-in type hybrids (PHEVs). The electrolyte solutions include carbonate-based solvents, such as dimethyl carbonate (DMC), ethylene carbonate (EC), or ethylmethyl carbonate (EMC). However, the carbonate-based solvents are problematic due to their high volatility, flammability, and decomposition at even modestly elevated temperatures, such as low as 60° C.

To reduce the flammability of the electrolyte solution, organophosphorus compounds, such as phosphates and cyclic phosphazenes, have been investigated as an additive or co-solvent to the electrolyte solution. Phosphoranimine compounds are known in the art as synthetic intermediates in the formation of polyphosphazene compounds or cyclic phosphazene compounds. However, beyond being synthetic intermediates, phosphoranimine compounds have thus far seen few uses themselves.

Phosphoranimine compounds have been disclosed for use in positive electrodes of lithium primary cells and for use in electrolyte solutions in combination with an aprotic organic solvent. The phosphoranimine compound includes a phosphorus-containing group, such as a phosphine oxide group, a sulfur-containing group, such as a sulfone group, or a nitrogen-containing group directly bonded to a nitrogen atom of the phosphoranimine compound.

As described in "An Electrochemically Compatible and Flame-Retardant Electrolyte Additive for Safe Lithium Ion Batteries" to Wu et al., *J. Power Sources* 227 (2013) 106-110, a phosphazenic compound was synthesized and tested as an electrolyte additive. The phosphazenic compound was triethoxyphosphazen-N-phosphoryldiethylester (PNP), which included a phosphine oxide functional group bonded to a nitrogen atom of the phosphazenic compound. The electrochemical characterization of the PNP-containing electrolyte was tested in MCMB/Li half-cells at 0% loading, 10% loading, 20% loading, 50% loading, and pure PNP. The PNP-containing electrolyte showed a 20% decrease in capacity at a 20% loading. At 10% loading, there was little observed difference when compared to traditional electrolytes. However, loadings in excess of 20%, for example, at 50% and 100%, were not able to cycle effectively.

It would be desirable to further improve electrolyte solutions to advance the usefulness of lithium-ion, and other, batteries.

BRIEF SUMMARY

An embodiment of the disclosure includes an electrolyte solution comprising at least one phosphoranimine compound and a metal salt. The at least one phosphoranimine compound has the chemical structure where X is an organosilyl group or a tert-butyl group and each of $R^1$, $R^2$, and $R^3$ is independently selected from the group consisting of an alkyl group, an aryl group, an alkoxy group, or an aryloxy group.

Another embodiment of the disclosure includes an energy storage device comprising a positive electrode, a negative electrode separated from the positive electrode, and an electrolyte solution. The electrolyte solution comprises at least one phosphoranimine compound having the chemical structure where X is an organosilyl group or a tert-butyl group and each of $R^1$, $R^2$, and $R^3$ is independently selected from the group consisting of an alkyl group, an aryl group, an alkoxy group, or an aryloxy group.

DETAILED DESCRIPTION

Phosphoranimine compounds for use as an electrolyte i.e., in an electrolyte solution, are disclosed, as are energy storage devices including the phosphoranimine compounds. The phosphoranimine compound is used as an additive or co-solvent in the electrolyte solution, or as a primary solvent in the electrolyte. The phosphoranimine compound is used to transport ions between electrodes of the energy storage device. The phosphoranimine compound may function as a replacement for all or a portion of an organic solvent used in a conventional energy storage device, such as in a battery or capacitor. The use of the phosphoranimine compound in the electrolyte or electrolyte solution may improve safety and provide a capability to operate the energy storage device with higher energy electrodes and high voltages. The phosphoranimine compound may exhibit sufficient metal stability, metal salt solubility, and viscosity to be used as the electrolyte. The phosphoranimine compound may also have sufficient electrochemical stability for use in the energy storage device.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein the term "electrolyte" means and includes an ionic conductor, which can be in a solid state, a liquid state, or a gas state (e.g., plasma).

As used herein, the term "energy storage device" means and includes a device configured and comprising materials formulated to convert stored chemical energy into electrical energy or electrical energy into chemical energy. The energy storage device may include, but is not limited to, a battery or a capacitor. By way of example only, the energy storage device may be a lithium-ion battery, a lithium metal battery, a sodium-ion battery, a sodium metal battery, a magnesium-ion battery, a magnesium metal, an ultracapacitor, or a supercapacitor. Such devices are known in the art and, therefore, are not described in detail herein.

The phosphoranimine compound is an acyclic (e.g., linear) compound that includes a double bond between a phosphorus atom and a nitrogen atom of the phosphoranimine compound. Three pendant groups are bonded to the phosphorus atom, and a pendant group is bonded to the nitrogen atom. The phosphoranimine compound is a monomeric phosphazene compound having the general chemical formula $XN=PR^1R^2R^3$ and the general chemical structure shown below:

where each R ($R^1$, $R^2$, $R^3$) is a pendant group bonded to the phosphorus atom and X is a pendant group bonded to the nitrogen atom. Each R ($R^1$, $R^2$, $R^3$) is independently selected from an alkyl group, an aryl group, an alkoxy group, an aryloxy group, or a sulfur or nitrogen analogue thereof, and X is an alkyl group, an aryl group, or an organosilyl group. A cationic pendant group may also be used as at least one of $R^1$, $R^2$, and $R^3$. The choice of functional group (X) bonded to the nitrogen atom may be more limited by synthetic chemistry techniques than is the choice of functional group ($R^1$, $R^2$, $R^3$) bonded to the phosphorus atom. The pendant groups on each of the phosphorus atom and the nitrogen atom may be the same as, or different from, one another. In one embodiment, at least two of the R groups on the phosphorus atom are different from each other and X is a trimethylsilyl group. In another embodiment, each of the R groups on the phosphorus atom is different from each other and X is a trimethylsilyl group. In another embodiment, each of the R groups on the phosphorus atom is different from each other and X is a tert-butyl group. In yet another embodiment, at least two of the R groups on the phosphorus atom are different from one another and X is a tert-butyl group. To improve stability, the phosphoranimine compound may not include a halogen atom directly bonded to the phosphorus atom, i.e., $R^1$, $R^2$, and $R^3$ may not be a halogen. However, as mentioned below, a halogen may be a substituent on one of the above-mentioned alkyl, aryl, alkoxy, or aryloxy groups.

The term "alkyl" means and includes a saturated, unsaturated, straight, branched, or cyclic hydrocarbon containing from one carbon atom to ten carbon atoms. Examples include, but are not limited to, methyl, ethyl, propyl(n-propyl, isopropyl, cyclopropyl), butyl(n-butyl, isobutyl, sec-butyl, tert-butyl, cyclobutyl), pentyl(n-pentyl, tert-pentyl, neopentyl, isopentyl, sec-pentyl, 3-pentyl, cyclopentyl), hexyl(isohexyl, cyclohexyl, 3-methylpentyl, 2,2-dimethylbutyl, 2,3-dimethylbutyl), heptyl, octyl, nonyl, or decyl.

The term "alkoxy" means and includes an alkyl group linked to an oxygen atom. The alkoxy group may include, but is not limited to, a methoxy group, an ethoxy group, a propoxy group, a butoxy group, a pentoxy group, a hexoxy group, a heptoxy group, an octoxy group, a nonoxy group, or a decoxy group, or an alkoxy-substituted alkoxy group (i.e., a polyether group), such as a methoxy methoxy group, a methoxy ethoxy group, an ethoxy methoxy group, an ethoxy ethoxy group, a methoxy ethoxy ethoxy group, etc.

The term "aryl" means and includes a hydrocarbon with alternating single and double bonds between carbon atoms forming a ring. Examples include, but are not limited to, a phenyl group, a tolyl group, or a naphthyl group. The aryl group may also contain a heteroatom, such as sulfur (thiophene, benzothiophene, etc.), oxygen (furan, benzofuran, etc.), or nitrogen (pyrrole, indole, pyridine, pyrimidine, imidazole, pyrazole, etc.).

The term "aryloxy" means and includes an aryl group linked to an oxygen atom.

In addition to the oxygen-containing groups (i.e., alkoxy, aryloxy) mentioned above, functional groups including other heteroatoms, such as sulfur or nitrogen, may be present in the pendant group. The heteroatom may link, for example, the alkyl group or the aryl group to the phosphorus atom of the phosphoranimine compound. By way of example only, the sulfur or nitrogen analogue may include, but is not limited to, an alkylsulfide, an alkylamine, an arylsulfide, or an arylamine.

The term "organosilyl" means and includes a compound having at least one carbon-silicon bond. At least one of an alkyl group, an alkoxy group, an aryl group, an aryloxy group, or a halogen group may be bonded to the silicon atom. The groups bonded to the silicon atom may be the same as, or different from, one another. The alkyl group may be further substituted, such as with a halogen. The aryl group may be further substituted, such as with a halogen, an alkyl group, or a haloalkyl group. By way of example only, the organosilyl may be a trialkylsilyl group.

The term "halo" or "halogen" means and includes fluoro, chloro, bromo, or iodo.

Any of the above-mentioned functional groups may be further substituted with at least one substituent, such as with a halogen, a carboxyl, a carbonyl, a C(O)(alkyl), a carbonate, another keto functional group, an amine, an alkyl, an alkoxy, an alkylthio, an amide, an alkylamino, a dialkylamino, a haloalkyl, a hydroxyalkyl, an alkoxyalkyl, a cyano, a sulfonyl group, or a phosphate group.

The cationic pendant group may include, but is not limited to, an ionic form of an aromatic amine, an aryl amine, or an aliphatic amine, such as a nitrogen-containing aryl group, a primary amine, a secondary amine, or a tertiary amine. The aromatic amine may be an aniline group. The nitrogen-containing aryl group may include, but is not limited to, a pyrrole group, an imidazole, a pyrazole, a pyridine group, a pyrazine group, a pyrimidine group, or a pyridazine group. By way of example, the amine group may be a methyl amino group or a dimethyl amino group.

The pendant groups on the phosphoranimine compound may be selected based on desired properties of the phosphoranimine compound, such as to achieve sufficient stability, viscosity, flammability, salt solubility, ion transport, and cell cyclability properties of the phosphoranimine compound to be used as the electrolyte or in the electrolyte solution. A desired balance of these properties may be achieved by appropriately selecting the pendant groups. The phosphoranimine compound may be tailored to exhibit a low viscosity at room temperature, stability toward lithium or other desired metal, a high lithium or sodium salt (or other alkali or alkaline earth metal salt) solubility, stability at high voltage, low flammability, and low volatility by appropriately selecting the pendant groups.

The viscosity of the phosphoranimine compound may be directly proportional to the molecular weight of the phosphoranimine compound, which is, in turn, affected by the molecular weight of the pendant groups. By minimizing the molecular weight of the pendant groups, the phosphoranimine compound may exhibit a viscosity within the desired range.

To achieve the desired viscosity, the pendant groups may be selected to produce an asymmetric phosphoranimine compound, i.e., a phosphoranimine compound having different R groups ($R^1$, $R^2$, $R^3$) on the phosphorus atom, which is believed to minimize molecular scale ordering and discourage a high extent of solvent self-association, aggressive multi-dentate bridging with an ionic species, and the generation of ordered or crystalline structures. The R groups ($R^1$, $R^2$, $R^3$) may also be selected such that the phosphoranimine compound does not easily conform to solvate cations past mono-dentate coordination, including electron withdrawing moieties, such as fluorine. The phosphoranimine compound may also be formulated in the electrolyte solution with dissimilar compounds to avoid solvent-to-solvent molecular association. These properties may directly impact the charge transfer process in the energy storage device where ions need to be able to readily associate and de-associate with solvent members through ion solvation, which has thermodynamic and kinetic costs in terms of energy and time requirements. Thus, selecting the pendant groups to achieve lower viscosity of the phosphoranimine compound may additionally make the energy storage device more efficient by economizing charge transfer at each electrode interface. If, however, the phosphoranimine compound is to be used as an additive in the electrolyte solution, the viscosity may be greater than the range described below to account for mixture effects with the electrolyte solution.

The pendant groups may also be selected to provide the phosphoranimine compound with sufficient electrochemical stability for use in the electrochemical environment of the energy storage device.

The pendant groups may also be selected such that the phosphoranimine compound has a lithium or sodium (or other alkali metal or alkaline earth metal) salt solubility of at least about 1.0 M concentration at room temperature. If, however, the phosphoranimine compound is to be used as an additive in the electrolyte solution, the lithium (or other metal) salt solubility may be less than the above-mentioned concentration to account for mixture effects with the electrolyte solution. The salt solubility of the phosphoranimine compound may also be improved by interactions with other components of the electrolyte solution. However, the phosphoranimine compound may still have the ability to desolvate from the lithium (or other metal) ions to enable adequate cycling efficiencies and allow acceptable rate capabilities.

The pendant groups on the phosphoranimine compound may be selected such that the phosphoranimine compound is a liquid at room temperature (from about 20° C. to about 25° C.) and at the temperature of use, is stable at a temperature greater than about 150° C., and is substantially non-flammable at operating temperatures to which the electrolyte solution is exposed. The phosphoranimine compound of the electrolyte solution may also be stable at high voltages, such as greater than about 4.5 V, during operation of the energy storage device including the electrolyte solution. The pendant groups on the phosphoranimine compound may be selected such that the phosphoranimine compound has an increased flash point and a decreased flame duration, resulting in reduced flammability of the electrolyte solution.

The melting point of the phosphoranimine compound may be in a range of from about −30° C. to about 10° C. so that the phosphoranimine compound is a liquid at room temperature and at the temperature of use. Since the phosphoranimine compound is to be used in the energy storage device, such as a battery, the temperature of use may be within a range of from about −25° C. to about 150° C. To maintain the phosphoranimine compound as a liquid, the pendant groups may include at least one of a fluorinated alkyl group, an aryl group, the organosilyl group, an oxygen-containing organic group, and a branched organic group on the nitrogen atom, and different R groups ($R^1$, $R^2$, $R^3$) may be used on the phosphorus atom. By selecting the X group from these functional groups, crystal packing may be disrupted so that the phosphoranimine compound may remain a liquid at room temperature.

While the presence of fluorinated organic groups on the phosphoranimine compound may undesirably inhibit salt solubility and ion transport properties of the phosphoranimine compound, by appropriately selecting the remaining pendant groups, a balance may be achieved between maintaining the phosphoranimine compound as a liquid and the solubility and ion transport properties of the phosphoranimine compound. In addition, while the presence of organosilyl groups has been previously avoided in conventional polyphosphazene compounds used in an electrolyte solution because of possible polymerization and side reactions with carbonyl oxygen atoms, having an organosilyl group on the phosphoranimine compound has, unexpectedly, been beneficial. The organosilyl group on the phosphoranimine compound has proven to be stable in an electrochemical environment, making the organosilyl group a good alternative to fluorinated organic groups.

A phosphine oxide functional group bonded to the nitrogen atom of the phosphoranimine compound, i.e., X is [—P(=O)$R_2$], may be avoided because the P=O bond is strongly attracted to lithium ions. Thus, the presence of the phosphine oxide is not beneficial in an electrolyte solution containing a lithium salt. Phosphoranimine compounds having a phosphine oxide functional group may exhibit a significant decrease in conductivity due to irreversible ion attraction as concentrations are increased in the electrolyte solution. Since an effective electrolyte needs to be able to effectively transport lithium (or other metal) ions, a weaker intramolecular attraction needs to be present in the phosphoranimine compound that can be readily reversed. Phosphine oxide-containing phosphoranimine compounds tend to form a P—N—P "pocket" in which the lithium (or other metal) ions tend to reside. A large amount of energy is needed to liberate the ion from this pocket and, thus, a coordination compound is formed that decreases conductivity and usefulness of the electrolyte. Thus, using a phosphine oxide functional group as X in the phosphoranimine compounds is not advantageous and tends to retard battery performance.

It was unexpected to find that the presence of the organosilyl group bonded to the nitrogen atom of the phosphoranimine compound instead of a phosphine oxide functional group reduced the excessively high intramolecular interactions that are seen between the P—N—P and $Li^+$ in phosphine oxide-containing phosphoranimine compounds. The organosilyl group on the nitrogen atom of the phosphoranimine compound improved ion cycling and exhibited no loss in capacity compared to the phosphine oxide-containing phosphoranimine compounds of Wu et al. During early cycling experiments (at nearly the same cycling rate as used by Wu et al.) using 50% of the phosphoranimine compound and 10% of a cyclic phosphazene trimer, it was possible to cycle cells with no loss in capacity from the conventional electrolyte solutions of Wu et al. The ability to perform at the same level at a 5-fold higher loading of the phosphoranimine compound was an unexpected result of including the organosilyl group on the nitrogen atom.

To provide good cyclability and conductivity to the phosphoranimine compound when used as an electrolyte or in an electrolyte solution, polyether (methoxyethoxy or 2-methoxyethoxyethoxy), carboxyl, carbonyl, carbonate, amine, or other keto functional groups may be present as substituents on the pendant groups bonded to the nitrogen and phosphorus atoms. However, if present, these groups may be distal to the P=N core to prevent or reduce unwanted side reactions, rearrangements, or incomplete reactions. By way of example only, the polyether functionalities (methoxyethoxy or 2-methoxyethoxyethoxy) may be positioned on the phosphorus atom to achieve high salt solubility along with good cyclability and ion conductivity.

Alkyl or aryl pendant groups having direct phosphorus-carbon bonds may be present in the phosphoranimine compound. While synthesizing direct alkyl or aryl pendant groups on conventional polyphosphazene compounds or conventional cyclic polyphosphazene compounds has been problematic, the phosphoranimine compounds may by synthesized by the methods described herein to include alkyl or aryl pendant groups having direct phosphorus-carbon bonds. The alkyl or aryl pendant groups having direct phosphorus-carbon bonds may provide at least one of a decreased viscosity and an enhanced conductivity and cell cyclability to the phosphoranimine compound.

The viscosity of the phosphoranimine compound may be within a range of from about 1 centipoise (cP) (about 0.001 Pa·s) to about 30 cP (about 0.03 Pa·s) at room temperature, such as from about 1 cP (about 0.001 Pa·s) to less than or equal to about 10 cP (about 0.01 Pa·s) at room temperature or from about 1 cP (about 0.001 Pa·s) to less than or equal to about 7 cP (about 0.007 Pa·s) at room temperature.

The phosphoranimine compound may have a high salt solubility, such as from about 0.5 M to about 1.2 M, in a solution of a metal salt, such as in a lithium salt solution, a sodium salt solution, other alkali metal solution, or alkaline earth metal solution, or combinations thereof. By way of example only, the lithium salt may be lithium hexafluorophosphate ($LiPF_6$), lithium tetrafluoroborate ($LiBF_4$), lithium perchlorate ($LiClO_4$), or combinations thereof. The high salt solubility of the phosphoranimine compound in the metal salt solution may enable the phosphoranimine compound to be complete stability toward the metal. The phosphoranimine compound may also have a conductivity in a 1.0 M salt of at least about 5 mS/cm at room temperature.

The phosphoranimine compound may provide a good ion cyclability in the energy storage device, such as at least a C/1 equivalent cycling rate. For use in vehicles, the phosphoranimine compound may exhibit at least a C/1 equivalent cycling rate. However, when used in consumer electronics, the phosphoranimine compound may exhibit a lower cycling rate.

Figure 1:
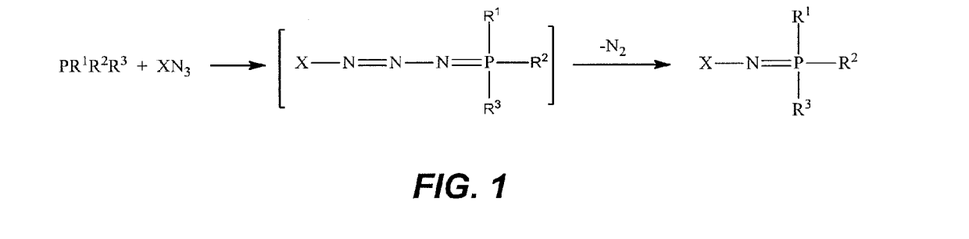
FIG. 1 describes a general method of synthesizing phosphoranimine compounds according to embodiments of the disclosure.

The phosphoranimine compounds may be synthesized by conventional techniques, such as by the Staudinger reaction or by the Neilson and Wisian-Neilson method. As shown in FIG. 1, in the Staudinger reaction, a phosphorus(III) compound is oxidized with an organoazide to form a four-coordinate phosphorus(V) imine ($XN=PR^1R^2R^3$) by the elimination of nitrogen from the phosphazide intermediate.

Although this reaction forms many desired products in a single step, it has the drawback of using organic azides, which are explosive. Trimethylsilylazides are frequently used in the formation of N-silylphosphoranimine compounds to ameliorate this issue. As a result, the stability of the resulting phosphoranimine compounds during subsequent isolation and purification steps may be insufficient. In addition, the Staudinger reaction is limited to synthesizing silylazides, where the resulting phosphoranimine compounds may be isolated in a single synthetic transformation.

Figure 2:
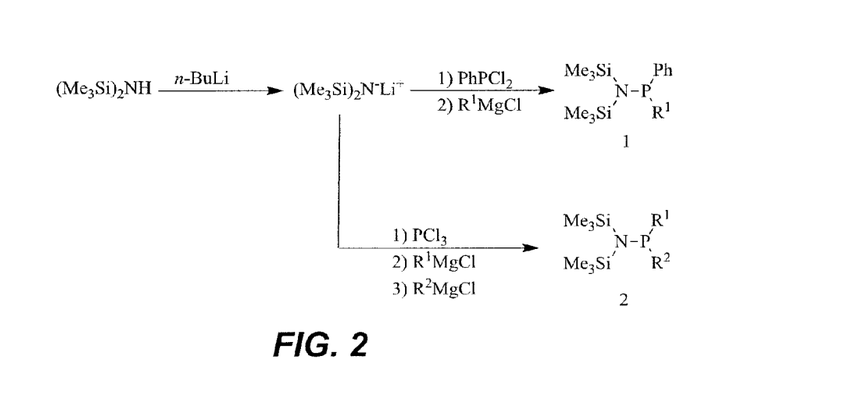
FIGS. 2 and 3 describe general methods of synthesizing phosphoranimine compounds according to embodiments of the disclosure.

For the Neilson and Wisian-Neilson method, aminophosphine (AP) compounds, such as silylaminophosphine compounds, having the desired functional groups on the phosphorus and nitrogen atoms are first synthesized, as shown in FIG. 2. The silylaminophosphine compound may be produced by reacting lithium bis(trimethylsilyl)amide (LiN(SiMe$_3$)$_2$) with an aryldichlorophosphine (R$^1$PCl$_2$) or trichlorophosphine (PCl$_3$) to give the analogous halo(silylamino)phosphine compound. Further halogen substitution with other alkyl/aromatic magnesium reagents may be conducted to produce either symmetrical or asymmetrical aminophosphine compounds. The resulting silylaminophosphine compounds are isolated via vacuum distillation prior to each subsequent synthetic step, and most of these compounds are high boiling liquids, especially when the functional groups are asymmetrical.

Figure 3:
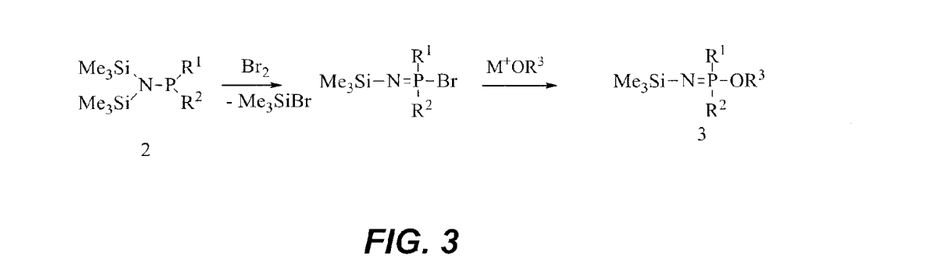
Figure 4:
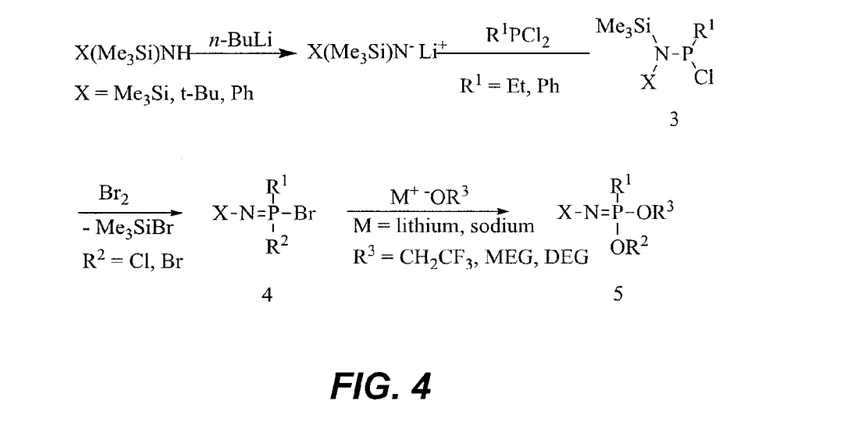
FIGS. 4 and 5 describe general methods of synthesizing phosphoranimine compounds according to embodiments of the disclosure.
Figure 5:
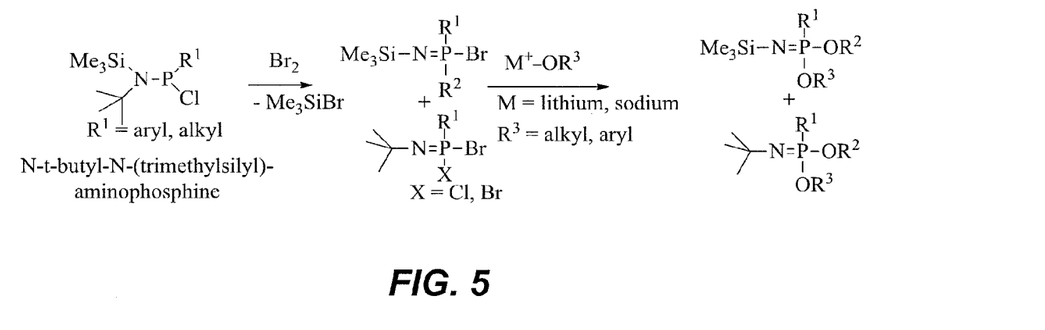

The AP compounds may then be oxidized to phosphoranimine compounds, as shown in FIG. 3. Halogenating reagents, such as bromine, are utilized in the phosphorus oxidation to form a corresponding phosphoranimine compound. Afterwards, nucleophilic displacement of the halogen atoms on the phosphoranimine compound can be effected with lithium/sodium phenoxides or alkoxides to give the desired phosphoranimine compound 3, as shown in FIGS. 3-5, where M is lithium or sodium and R$^3$ is alkyl or aryl. The Neilson and Wisian-Neilson method is a multi-step synthesis. However, an assortment of N-organo- as well as N-silyl-phosphoranimines may be produced and isolated. In one embodiment, the phosphoranimine compound may be produced by the Neilson and Wisian-Neilson method to maximize the number of phosphoranimine compounds that may be synthesized.

High purity alkyl dichlorophosphines, which are commercially available from numerous sources, may be used to produce the phosphoranimine compounds. As shown in FIGS. 3-5, two synthetic isolation acts are necessary to produce compounds 3 and 5. Compound 4 is an intermediate that may be isolated, but Compound 4 is not expected to be stable in an electrochemical environment, such as that found in an energy storage device, due to the reactive nature of the phosphorus-halide bond.

The phosphoranimine compound may be used as an additive in the electrolyte solution, as a co-solvent in the electrolyte solution, or as the primary solvent in the electrolyte solution. If the phosphoranimine compound is used as an additive, the phosphoranimine compound may be present in the electrolyte solution at from about 0.1% by weight (wt %) to about 15 wt %, such as from about 5 wt % to about 15 wt % or from about 1 wt % to about 10 wt %. If the phosphoranimine compound is used as a co-solvent, the phosphoranimine compound may be present in the electrolyte solution at from greater than about 15 wt % to less than about 50 wt %, such as from about 20 wt % to about 25 wt % or from about 25 wt % to about 35 wt %. If the phosphoranimine compound is used as the primary solvent, the phosphoranimine compound may be present in the electrolyte solution at greater than or equal to about 50% by volume, such as from about 55 wt % to about 100 wt % or from about 75 wt % to about 95 wt %. The electrolyte solution may also include a mixture of phosphoranimine compounds according to embodiments of the disclosure.

In addition to the phosphoranimine compound, the electrolyte solution may include a metal salt and an organic solvent. The metal salt may be a salt of lithium, sodium, magnesium, or other alkali metal or alkaline earth metal, or combinations thereof. By way of example only, the lithium salt may be lithium hexafluorophosphate (LiPF$_6$), lithium tetrafluoroborate (LiBF$_4$), lithium perchlorate (LiClO$_4$), or combinations thereof. The metal salt may be present in the electrolyte solution at a concentration of from about 0.5 M to about 1.2 M, such as from about 0.8 M to about 1.1 M. The organic solvent may be stable at the operating temperature and operating voltage of the energy storage device. As examples, the organic solvent may be an organic carbonate including, but not limited to, ethylene carbonate (EC), ethyl methyl carbonate (EMC), dimethyl carbonate (DMC), diethyl carbonate (DEC), propylene carbonate (PC), or combinations thereof. The organic solvent may also be a linear ester compound, such as methyl butyrate (MB), singly or in mixtures with other esters or carbonates. The organic solvent may account for from about 1 wt % to about 90 wt % of the electrolyte solution, such as from about 10 wt % to about 70 wt % of the electrolyte solution.

The electrolyte solution including the phosphoranimine compound may be used as a solvent in an energy storage device, such as in a lithium battery, capacitor, ultracapacitor, or supercapacitor. The term "lithium battery" means and includes a lithium-ion battery or a lithium metal battery, each of which is known in the art and, therefore, is not described in detail herein. However, the electrolyte solution may be used in other types of energy storage devices, such as a sodium-ion battery, a sodium metal battery, a magnesium-ion battery, or a magnesium metal battery. The energy storage device may be used by way of non-limiting example in a vehicle, such as a car (private, commercial, fleet, or military), an aircraft, or a watercraft. The energy storage device may be a replacement for conventional nickel-metal hydride batteries, lead-acid batteries, or nickel-cadmium batteries.

In situations where the phosphoranimine compound is an additive or a co-solvent, the electrolyte solution may be prepared by dissolving the phosphoranimine compound and the metal salt in the organic solvent. When the phosphoranimine compound and metal salt are dissolved, the electrolyte solution is configured to function as a liquid that carries electricity in the energy storage device. In situations where the phosphoranimine compound is a primary solvent, the electrolyte solution may be prepared by combining the phosphoranimine compound and the metal salt.

Figure 6:
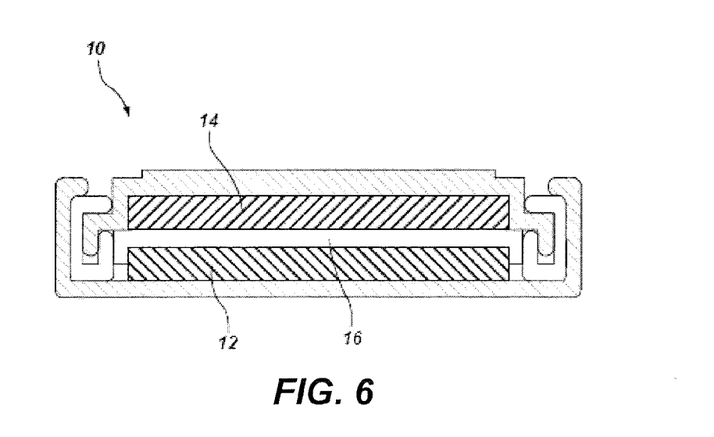
FIG. 6 is a schematic illustration of an energy storage device according to embodiments of the disclosure.

The electrolyte solution including the phosphoranimine compound may be used in an energy storage device 10 (e.g., a battery) that includes a positive electrode 12 (e.g., a cathode), a negative electrode 14 (e.g., an anode) separated from the positive electrode 12, and an optional separator 16 between the electrodes 12, 14, as shown in FIG. 6. The electrolyte solution may be positioned in the separator 16 but is in contact with the positive electrode 12 and the negative electrode 14. By way of example, the energy storage device 10 may be a lithium battery containing the electrolyte solution. The electrolyte solution including the phosphoranimine compound of the disclosure may exhibit a higher stability and longer cycle life than conventional electrolyte solutions.

The following examples serve to explain embodiments of the disclosure in more detail. These examples are not to be construed as being exhaustive or exclusive as to the scope of this disclosure.

EXAMPLES

The following reagents were obtained from commercial sources and used without further purification: (Me₃Si)₂NH (Aldrich), (Me₃Si)(t-Bu)NH (Aldrich), (Me₃Si)(Ph)NH (Aldrich), EtPCl₂ (Strem), (Me₃Si)₂N—PMe₂ (Gelest), PhPCl₂ (Aldrich), n-BuLi (2.5 M in hexane; Aldrich), NaH (60% in oil; Aldrich), and bromine (Aldrich). 2,2,2-trifluoroethanol, 2-methoxyethanol, and 2-(methoxyethoxy)ethanol were obtained from Aldrich and purified by vacuum distillation. Anhydrous solvents, such as diethyl ether, tetrahydrofuran, toluene, and hexane were obtained from Aldrich and used as received. Proton, $^{13}C\{^1H\}$, and $^{31}P\{^1H\}$ NMR spectra were recorded on a Bruker Ascend Avance III 600 MHz spectrometer. Elemental analysis was performed by Galbraith Laboratory, Inc., Knoxville, Tenn., on selected compounds.

A series of phosphoranimine compounds was prepared using the Neilson and Wisian-Neilson method as described below. The desired aminophosphine compound was prepared, and then oxidized to the corresponding phosphoranimine compound. The halogen groups on the phosphorus (V) center were substituted with pendant groups containing an increasing number of etheric oxygen atoms to obtain the desired property of high lithium salt concentration dissolved in the phosphoranimine compound.

Example 1: Synthesis of Aminophosphine Compounds (AP-1 to AP-4)

A general reaction scheme is given below for the synthesis of P-chloro-P-ethyl-N-t-butyl-N-(trimethylsilyl)aminophosphine (AP-2), the chemical structure of which is shown below:

A 500 mL three-neck, round-bottom, flask, equipped with a gas inlet, a 125 mL addition funnel, magnetic stir bar, and a rubber septum was charged with nitrogen, (Me₃Si)(t-Bu)NH (18.1 mL, 0.096 mole), and diethyl ether (250 mL). The solution was cooled to −78° C. by a dry ice/acetone bath for 15 minutes, and n-BuLi (2.5 M in hexane, 38.5 mL, 0.096 mole) was added to the addition funnel via syringe. The n-BuLi was slowly added drop wise and, upon finishing the addition, the funnel was washed with diethyl ether (~30 mL). The dry ice/acetone bath was removed and the mixture was allowed to warm to room temperature (20° C.–25° C.) for two hours. The solution was cooled to −78° C. by a dry ice/acetone bath for 15 minutes. Fifty mL of diethyl ether was injected by syringe into the addition funnel. Next, the EtPCl₂ (10.0 mL, 0.096 mole) was added by syringe and the two solutions were mixed together. The phosphine solution was slowly added dropwise and, upon finishing, the addition funnel was washed with diethyl ether (~30 mL). The dry ice/acetone bath was removed and the mixture was allowed to warm to room temperature overnight. The next day, 75% of the ether was removed under reduced pressure, and the remaining solution was washed three times with hexane (~200 mL). The supernate was transferred by cannula into a nitrogen purged, 1000 mL round-bottom flask equipped with a magnetic stir bar. The hexane was removed by reduced pressure, leaving an oily residue. Fractional distillation under vacuum gave AP-2 as a colorless, clear liquid.

Similar protocols were used to synthesize P-chloro-P-phenyl-N-t-butyl-N-(trimethylsilyl)aminophosphine (AP-1), P-chloro-P-ethyl-N-phenyl-N-(trimethylsilyl)aminophosphine (AP-3), and P-chloro-P-ethyl-N,N-bis(trimethylsilyl)aminophosphine (AP-4). The chemical structures of which are shown below, respectively:

The synthesis of AP-1 to AP-4 was straightforward and the products (AP-1 to AP-4) were isolated in good yields. Multinuclear NMR spectra (results not shown) indicated that the mixed N-substitutents compounds were relatively clean. Isolation of AP-1 to AP-4 was done by vacuum distillation, and all compounds (AP-1 to AP-4) were colorless, clear liquids at room temperature. The isolated compounds (AP-1 to AP-4) did not show any immediate issues as degradation products while under an inert atmosphere.

Example 2: Synthesis of Phosphoranimine Compounds (PA-1 to PA-5)

A 100 mL three-necked, round-bottom flask, equipped with a gas inlet, 60 mL addition funnel, magnetic stir bar, and a rubber septum was purged with nitrogen. One of the AP compounds (0.072 mole) described in Example 1 (AP-1 to AP-4) was added by syringe to the flask containing 60 mL of anhydrous toluene. The flask was cooled to 0° C., and bromine (4.0 mL, 0.078 mole) was introduced to the addition funnel by syringe. The bromine solution was added dropwise to the cooled flask with constant stirring. The addition was stopped when a slight red-brown color persisted in the flask. The ice bath was removed, and the solution was slowly warmed to room temperature for an hour. The solvent and by-product (Me₃SiBr) was removed by reduced pressure, leaving a red-brown viscous liquid.

In a different setup, a 250 mL three-necked, round-bottom flask, equipped with a gas inlet, 125 mL addition funnel, magnetic stir bar, and a rubber septum was purged with nitrogen. One hundred mL of anhydrous tetrahydrofuran was introduced into the flask, and sodium hydride (60% in oil, 7.2 g) was added directly into the flask. Distilled 2-(methoxyethoxy)ethanol (21.6 g, 22 mL, 0.180 mole) was added in the addition funnel by syringe, and the alcohol was added slowly into the flask. An ice bath was used to suppress the heating. Upon completion, the solution was allowed to warm to room temperature for about three hours. The solution was cooled to 0° C. for 10 minutes, and one of the AP compounds (0.072 mole) described in Example 1 (AP-1 to AP-4) was added directly to the flask via syringe with 50 mL of anhydrous tetrahydrofuran with stirring. After the addition, the solution was warmed to room temperature overnight. The next day, the stirring was stopped and the salts settled to the bottom of the flask. The supernatant was transferred to another 250 mL round-bottom flask, where the solvent was removed by reduced pressure leaving behind an oil. Fractional distillation under vacuum yielded a colorless, clear liquid.

Similar protocols were used to synthesize each of N-t-butyl-P,P-bis(2,2,2-trifluoroethoxy)-P-phenylphosphoranimine (PA-1), N-t-butyl-P,P-bis(2-methoxyethoxy)-P-ethylphosphoranimine (PA-2), N-trimethylsilyl-P,P-dimethyl-P-((2-methoxyethoxy)ethoxy)phosphoranimine (PA-3), N-t-butyl-P-(2-methoxyethoxy)-P-((2-methoxyethoxy)ethoxy)-P-ethylphosphoranimine (PA-4), and N-trimethylsilyl-P,P-bis((2-methoxyethoxy)ethoxy)-P-ethylphosphoranimine (PA-5). The chemical structures of which are shown below, respectively:

The isolation of PA-1 to PA-5 was done by vacuum distillation, and all compounds were colorless, clear liquids at room temperature. PA-1 to PA-5 did not show any immediate issues as degradation products while under an inert atmosphere.

Example 3: Stability of PA-1 to PA-5

Figure 7:
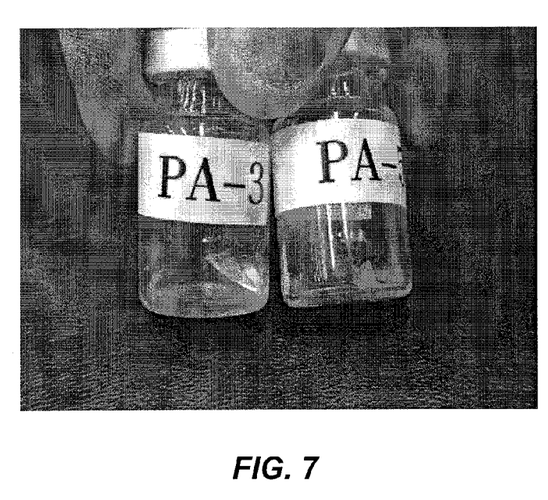
FIG. 7 is a photograph illustrating the stability of lithium in phosphoranimine compounds according to embodiments of the disclosure.

PA-1 to PA-5 were analyzed to determine their stability with lithium metal and electrochemical environments. Fresh metallic lithium was placed into a small vial with some of each of the phosphoranimine compounds (PA-1 to PA-5) and sealed. This was performed in an argon glovebox. The lithium was immersed in the respective phosphoranimine compound for a minimum of six months, with occasional agitation. After months of immersion, the lithium remained untarnished and the phosphoranimine compounds showed no visible sign of reaction or degradation with the metallic lithium. A photo of the metallic lithium in each of PA-3 and PA-5 at the end of the study is shown in FIG. 7. Although not shown in FIG. 7, PA-1, PA-2, and PA-4 exhibited no signs of degradation or reaction with the metallic lithium.

Example 4: Lithium Salt Solubility of PA-1 to PA-5

The lithium salt solubility of each of the PA compounds was determined by conventional techniques, which are not described in detail herein. In order to be acceptable as an electrolyte solvent in a lithium battery, high lithium salt solubility is desired. Without the ability to dissolve a suitable lithium salt, such as $LiPF_6$, at nearly one molar concentration or above, the resulting battery will have poor rate performance and low internal conductivity. Each of PA-1 to PA-5 had a different lithium salt solubility (with $LiPF_6$). PA-1 did not show relevant concentration dissolution of the lithium salt. As shown in Table 1, PA-1 to PA-5 exhibited higher dissolved salt concentrations. It was anticipated that the addition of distal heteroatoms would provide the desired result, as they were free to associate significantly with the lithium cations, thus increasing anion/cation pair separation and increasing solubility. The difference in salt solubility of PA-5 is nearly an order of magnitude greater than that of PA-3 and PA-4. This was unexpected with the PA series of compounds, and culminated with PA-5, which had more than acceptable dissolved salt concentrations for lithium battery applications.

TABLE 1

| Lithium Salt Solubility in each of PA-1 to PA-5. | |
|---|---|
| Phosphoranimine (PA) | Concentration (µg of Li/ml of PA)[% RSD] |
| PA-1 | 86.1 ± 1.7 |
| PA-2 | 714.6 ± 0.8 |
| PA-3 | 1855.3 ± 4.7 |
| PA-4 | 1709.8 ± 4.8 |
| PA-5 | 15484.7 ± 1.2 |

Example 5: Viscosity of PA-5 and PA-5 Mixtures with EC:EMC

Figure 13:
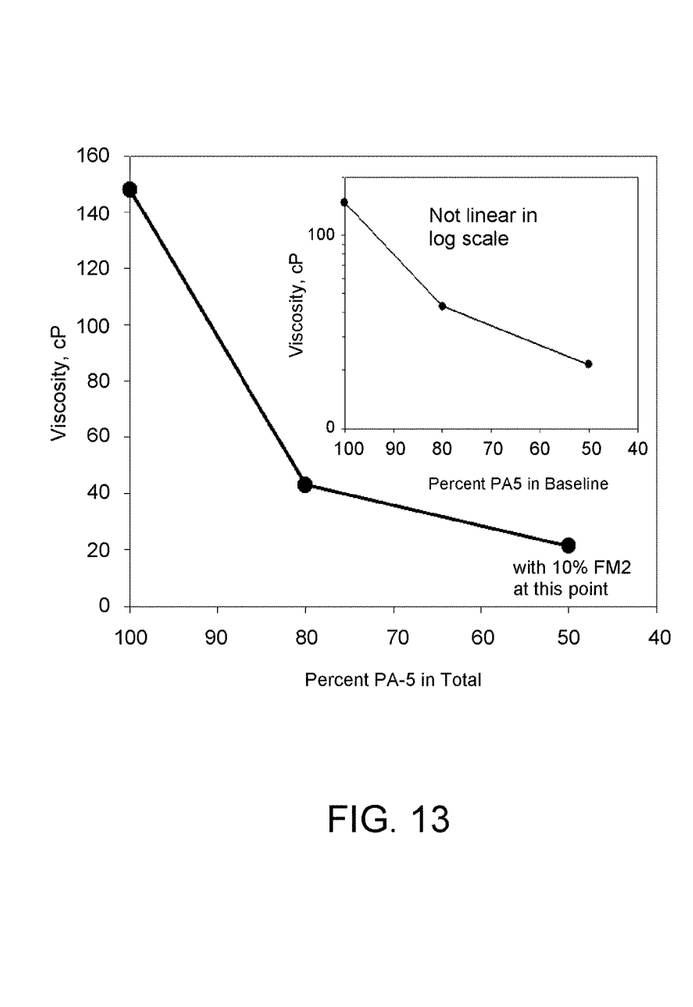
FIG. 13 is a graph showing viscosity as a function of the amount of phosphoranimine compound in an electrolyte solution according to embodiments of the disclosure.
Figure 14:
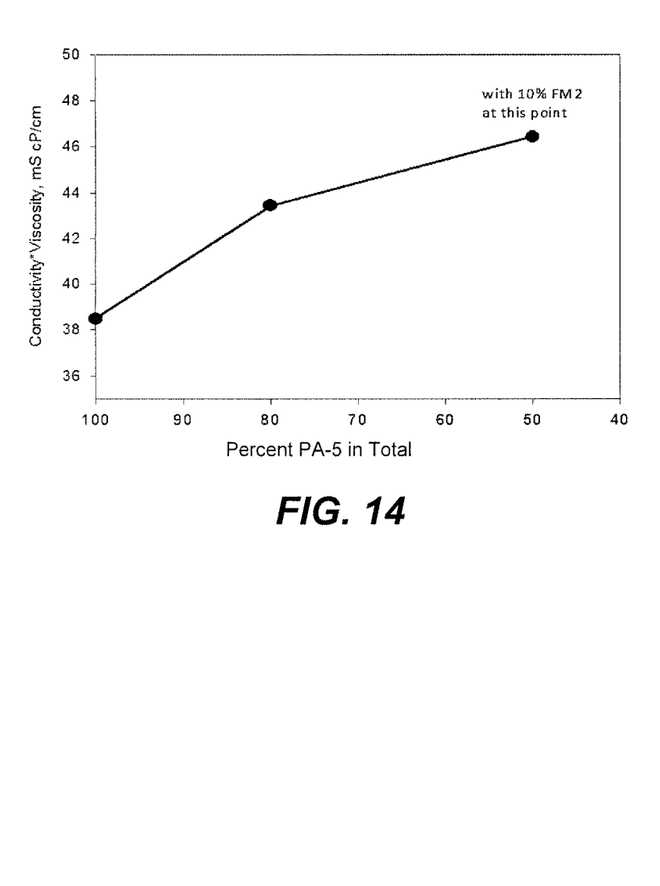
FIG. 14 is a graph showing conductance-viscosity as a function of the amount of phosphoranimine compound in an electrolyte solution according to embodiments of the disclosure.

In the preparation of PA-1 to PA-5, longer pendant groups on the phosphorus center were employed for salt solubility purposes. However, it is known that a higher molecular weight of the resulting compound tends to raise viscosity. In a practical battery application, a more intimate association of lithium ions with these types of species can cause an increased viscosity through chelation and transient dynamic dimerization. Therefore, the viscosity of PA-5 and mixtures of PA-5 with 1:2 EC:EMC was determined. As shown in FIGS. 13 and 14, the viscosity of electrolyte solutions containing PA-5 decreased as EC:EMC increased (80% and 50%), and the decrease was nearly an order of magnitude different when the electrolyte solution included the PA-5 and 50% EC:EMC. However, the viscosity of PA-5 was proven to be entirely acceptable for battery applications, while maintaining excellent values for all of the other key attributes.

Example 6: Electrochemical Cyclability of PA-5

Figure 8:
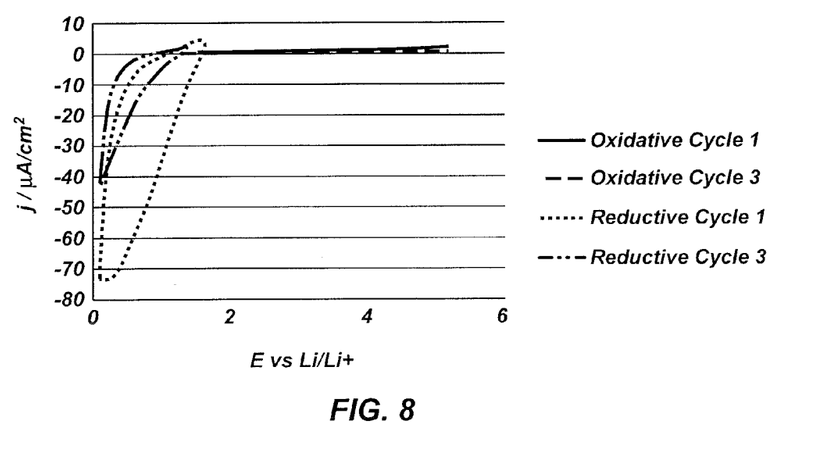
FIGS. 8-11 are graphs illustrating the electrochemical properties of electrolyte solutions including the phosphoranimine compounds according to embodiments of the disclosure.

Two types of experiments were conducted to determine the suitability of the phosphoranimine compounds as possible replacements for carbonate electrolytes. The electrochemical cyclability of the PA compounds of Example 2 were determined as either an electrolyte blend with carbonates or simply salted PA electrolytes were cycled between 0.02 V and 5 V using nickel and aluminum electrodes. The results are shown in FIG. 8 for PA-5, and for mixtures of PA-5 and 1:2 ethylene carbonate:ethylmethyl carbonate (EC:EMC) in FIGS. 9 and 10. In both instances, the electrolytes were salted using LiPF$_6$. For the PA-5 evaluation, the INL baseline (INL BL) used was 1:2 ethylene carbonate: ethylmethyl carbonate (EC:EMC), a commonly used commercial battery electrolyte. The 100% PA-5 was compared to 80% PA-5:20% INL BL and to 50% PA-5:40% INL BL:10% FM2, where FM2 is a cyclic phosphazene trimer.

Figure 9:
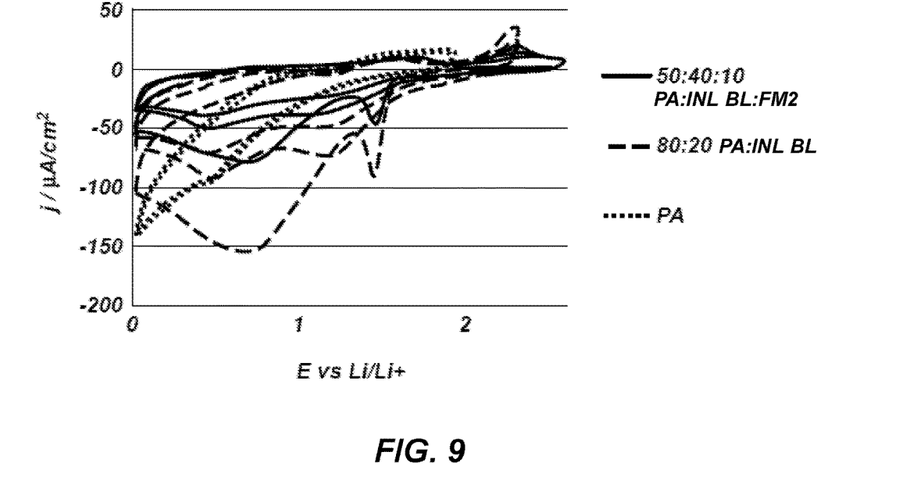
Figure 10:
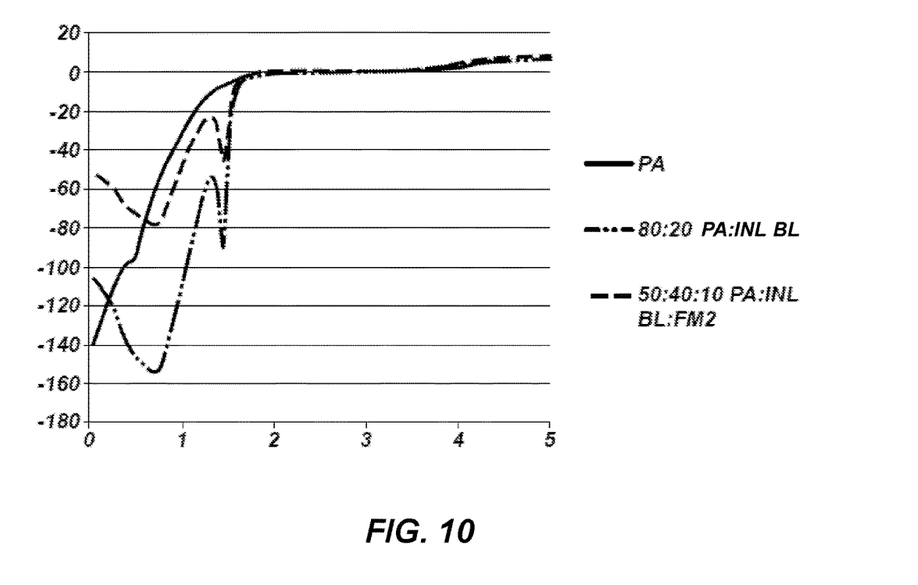

FIGS. 8, 9, and 10 indicate that electrolyte solutions including PA-5 have similar electrochemical characteristics when voltage is applied as those observed with conventional electrolyte solutions. One difference between electrolyte solutions including PA-5 and those including mixtures of PA-5 and 1:2 EC:EMC is that PA-5 did not appear to form a stable passivation layer (solid electrolyte interphase, SEI) when used as the primary (i.e., sole) solvent in the electrolyte solution. However, when PA-5 was combined with carbonates (INL BL), a stable SEI was formed.

Figure 11:
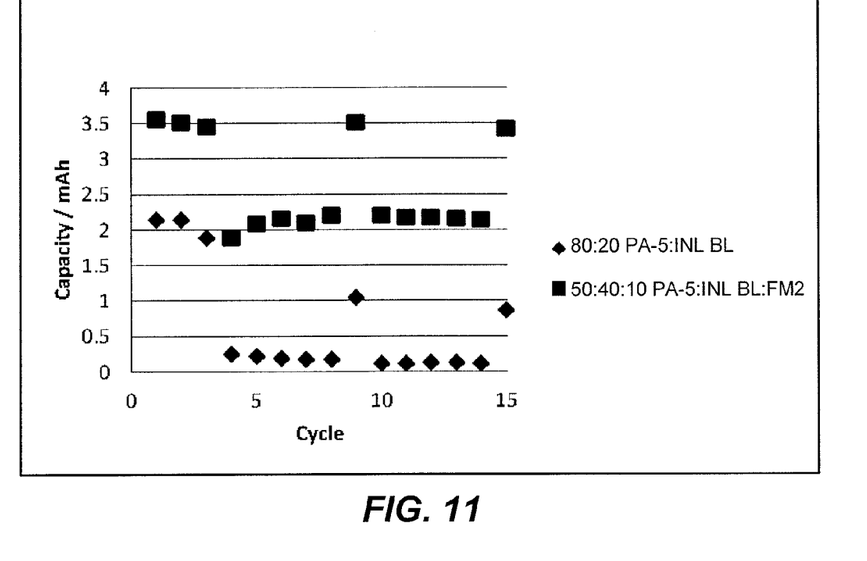

This is highlighted more thoroughly in the full cell cycling using a graphite-based anode and a lithium, manganese-rich mixed metal oxide cathode, which contained full cell cycling data for PA-5 with various amounts of INL BL and FM2. Cycles 1-3, 4, and 9 were conducted at a C/10 rate and cycles 5-8 and 10-15 were conducted at a C/3 rate. As shown in FIG. 11, at a 50% loading of PA-5 and 10% loading of FM2, there was no loss in C/10 capacity.

Thus, FIGS. 8-11 show that electrolyte solutions including PA-5 and mixtures of PA-5 and carbonates are suitable as replacement electrolyte components for Li-ion systems and potentially for other ion-based systems, such as Na-ion and Mg-ion. PA-5 also had sufficient lithium salt solubility to be useful in a lithium ion battery. The high salt solubility coupled with the stability of PA-5 toward metallic lithium and the acceptably low viscosity provided evidence that phosphoranimine compounds with appropriately selected functional groups function well as electrolytes for high energy lithium batteries.

Figure 12:
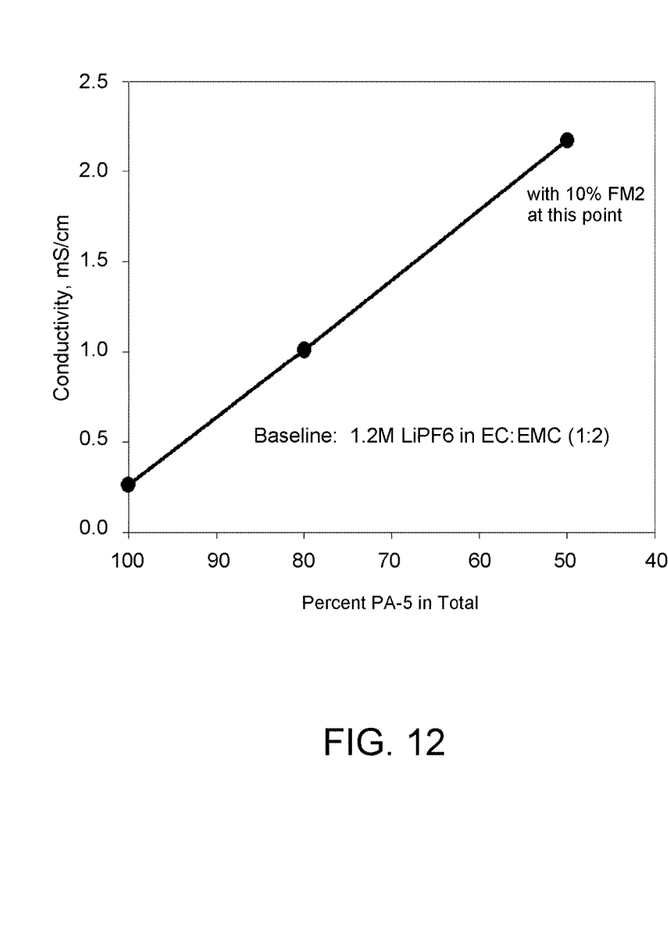
FIG. 12 is a graph showing conductivity as a function of the amount of phosphoranimine compound in an electrolyte solution according to embodiments of the disclosure.

Example 7: Effect of PA-5 Content on Conductivity, Viscosity, Conductance-Viscosity and Flashpoint The effect on conductivity, viscosity, conductance-viscosity, and flashpoint of different amounts of PA-5 in an electrolyte solution was determined. These properties were determined by conventional techniques. The electrolyte solution included 1.2 M LiPF$_6$ in EC-EMC (1:2) in addition to the indicated amount of PA-5. At lower percentages of PA-5 in the electrolyte solution, 10% of FM2 was included. As shown in FIG. 12, the conductivity of the electrolyte solution was greater than about 2.0 mS/cm when the electrolyte solution included 50% PA-5 and 10% FM2. When the electrolyte solution included 80% PA-5, the conductivity decreased to about 1.0 mS/cm. At 100% PA-5, the conductivity of the electrolyte solution was about 0.3 mS/cm.

As shown in FIG. 13, the viscosity of the electrolyte solution including 50% PA-5 and 10% FM2 was about 20 cP. When the electrolyte solution included 80% PA-5, the viscosity increased to about 40 cP. At 100% PA-5, the viscosity of the electrolyte solution was about 150 cP.

FIG. 14 shows the Walden product or conductance-viscosity (the product of viscosity and conductivity at infinite dilution of the electrolyte solution) as a function of the amount of PA-5 in the electrolyte solution. The non-constant Walden product as a function of the PA-5 content indicates a shift in the mechanism that influences ionic conductance of the electrolyte solution. FIG. 14 indicates that effective solvated ion sizes were larger at higher amounts of PA-5 and/or that there are fewer free ions at higher amounts of PA-5 due to a lower solvent dielectric.

Figure 15:
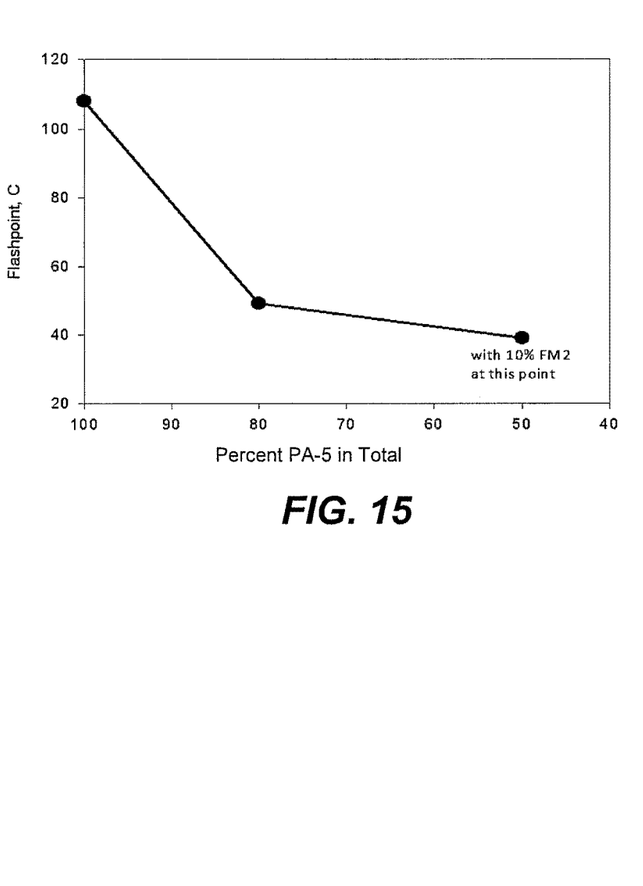
FIG. 15 is a graph showing the flashpoint as a function of the amount of phosphoranimine compound in an electrolyte solution according to embodiments of the disclosure.

As shown in FIG. 15, the flashpoint of the electrolyte solution increased as the amount of PA-5 in the electrolyte solution increased. The flashpoint of the electrolyte solution including 50% PA-5 and 10% FM2 was about 40° C. When the electrolyte solution included 80% PA-5, the flashpoint increased to about 50° C. At 100% PA-5, the flashpoint of the electrolyte solution was about 110° C. The flashpoint of the electrolyte solution as a function of the amount of PA-5 in the electrolyte solution closely corresponded to the viscosity of the electrolyte solution as a function of the amount of PA-5 in the electrolyte solution, inferring that the rate of diffusion of volatile components from liquid to vapor phase is viscosity limited.

While the disclosure may be susceptible to various modifications and alternative forms, specific embodiments have been shown by way of example in the Examples and drawings and have been described in detail herein. However, it should be understood that the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. An electrolyte solution comprising:
at least one phosphoranimine compound of the chemical structure where X is an organosilyl group or a tert-butyl group and each of R$^1$, R$^2$, and R$^3$ is independently selected from the group consisting of an alkyl group, a substituted alkyl group, an aryl group, a substituted aryl group, an alkoxy group, a substituted alkoxy group, an aryloxy group, or a substituted aryloxy group, and
a metal salt.

2. The electrolyte solution of claim 1, wherein each of R$^1$, R$^2$, and R$^3$ is different.

3. The electrolyte solution of claim 1, wherein at least two of R$^1$, R$^2$, and R$^3$ are different.

4. The electrolyte solution of claim 1, wherein X is a trimethylsilyl group.

5. The electrolyte solution of claim 1, wherein X is the tert-butyl group.

6. The electrolyte solution of claim 1, wherein the at least one phosphoranimine compound is a liquid at a temperature from about 20° C. to about 25° C.

7. The electrolyte solution of claim 1, wherein the at least one phosphoranimine compound exhibits a viscosity of from about 1 centipoise at room temperature to about 30 centipoise at room temperature.

8. The electrolyte solution of claim 1, wherein the at least one phosphoranimine compound comprises at least one of 9. The electrolyte solution of claim 1, wherein at least one of $R^1$, $R^2$, or $R^3$ comprises a halogenated alkyl group, a halogenated aryl group, a halogenated alkoxy group, or a halogenated aryloxy group.

10. The electrolyte solution of claim 1, wherein at least one of $R^1$, $R^2$, or $R^3$ comprises a cationic pendant group.

11. The electrolyte solution of claim 1, wherein the metal salt comprises a salt of an alkali metal or a salt of an alkaline earth metal.

12. The electrolyte solution of claim 1, wherein the metal salt comprises a lithium salt, a sodium salt, a magnesium salt, or combinations thereof.

13. The electrolyte solution of claim 1, wherein the at least one phosphoranimine compound comprises from about 0.1% by weight to less than about 15% by weight of the electrolyte solution.

14. The electrolyte solution of claim 1, wherein the at least one phosphoranimine compound comprises from greater than or equal to about 15% by weight to less than about 50% by weight of the electrolyte solution.

15. The electrolyte solution of claim 1, wherein the at least one phosphoranimine compound comprises greater than or equal to about 50% by weight of the electrolyte solution.

16. The electrolyte solution of claim 1, further comprising at least one organic solvent.

17. An energy storage device, comprising:
a positive electrode, a negative electrode separated from the positive electrode, and an electrolyte solution in contact with the positive electrode and the negative electrode, the electrolyte solution comprising:
at least one phosphoranimine compound of the chemical structure where X is an organosilyl group or a tert-butyl group and each of $R^1$, $R^2$, and $R^3$ is independently selected from the group consisting of an alkyl group, a substituted alkyl group, an aryl group, a substituted aryl group, an alkoxy group, a substituted alkoxy group, an aryloxy group, or a substituted aryloxy group.

18. The energy storage device of claim 17, wherein the electrolyte solution further comprises a salt of an alkali metal or a salt of an alkaline earth metal.

19. The energy storage device of claim 17, wherein the electrolyte solution further comprises a lithium salt, a sodium salt, a magnesium salt, or combinations thereof.

20. The energy storage device of claim 17, further comprising a separator between the positive electrode and the negative electrode.

* * * * *

UNITED STATES PATENT AND TRADEMARK OFFICE
CERTIFICATE OF CORRECTION

PATENT NO. : 9,761,910 B2  Page 1 of 1
APPLICATION NO. : 14/720493
DATED : September 12, 2017
INVENTOR(S) : John R. Klaehn et al.

It is certified that error appears in the above-identified patent and that said Letters Patent is hereby corrected as shown below:

In the Specification

Column 8,   Line 44,   change "solution, or alkaline" to --solution, alkaline--
Column 10,  Line 8,    change "or other alkali metal" to --other alkali metal--

Signed and Sealed this
Twelfth Day of June, 2018

Andrei Iancu
*Director of the United States Patent and Trademark Office*